United States Patent
Denoncourt et al.

[15] 3,671,731
[45] June 20, 1972

[54] PYTHAGOREAS ADDER OR SOLID STATE RESOLVER

[72] Inventors: Gilles J. Denoncourt, Anjou, Quebec; Peter T. Nejedly, Montreal, Quebec, both of Canada

[73] Assignee: Canadian Marconi Company, Montreal, Quebec, Canada

[22] Filed: Sept. 30, 1969

[21] Appl. No.: 862,344

[30] Foreign Application Priority Data

Oct. 9, 1968 Canada...................................032,096

[52] U.S. Cl..............................235/192, 235/186, 235/189
[51] Int. Cl. .........................................................G06g 7/22
[58] Field of Search..................235/184, 186, 189, 191, 192, 235/193.5, 194, 196

[56] References Cited

UNITED STATES PATENTS 3,493,737  2/1970  Edelson...................................235/189
3,495,078  2/1970  James et al. ...........................235/189

*Primary Examiner*—Eugene G. Botz
*Assistant Examiner*—Jerry Smith
*Attorney*—Neil W. McDermid

[57] ABSTRACT

A system for providing the square root of the sum of the squares of two input signals which can also be used to extract the common carrier component of the sin and cos output windings of a synchro differential resolver. Each input signal is applied to a divider means and to a multiplier means. The output of the divider means constitutes the other input to the multiplier means, and the output of both multiplier means are fed to an adder. The output of the adder constitutes the other input to the divider means. In addition, the output of the adder constitutes the square root of the sum of the squares of the two input signals or the common carrier component of the sin and cos output windings of a synchro differential resolver — depending on the application.

2 Claims, 4 Drawing Figures

Patented June 20, 1972  3,671,731

INVENTORS
G. J. DENONCOUR
P T. NEJEDLY

Fetherstonhaugh & Co.
PATENT AGENTS

PYTHAGOREAS ADDER OR SOLID STATE RESOLVER

This invention relates to electronic means for providing the square root of the sum of the squares of two input signals. More specifically, this invention relates to electronic means for extracting the common carrier component of the sin and cos output windings of a synchro differential resolver to thereby provide useful outputs related to the sin and cos functions of the angle whose sin and cos are represented by electrical signals as relative amplitudes on the output windings of the synchro differential resolver.

In electronic navigation systems, it is often necessary to utilize, for example, the sin and cos functions of the angle between desired track and track made good. Thus, it may be necessary to compute the along and across track speed or distance from the heading angle and ground speed as sensed by a Doppler sensor. The sin and cos functions of the angle between desired track and track made good may be derived with a synchro differential resolver by feeding the sensed track angle to one input winding of a synchro and the desired track angle on the shaft of the same synchro. As is well known, the output of the synchro will be the sin and cos functions of the angle between desired track and track made good superimposed on a common carrier (usually the 400 Hz supply).

The functions are represented by the relative amplitudes of the electrical signal across the three-wire or four-wire output windings of the synchro. The three-wire output can be easily converted to the more useful four-wire output by means of a Scott "T" transformer.

Although the output signals carry the sin and cos information, they are not individually useful as the common carrier component is dependent on the line voltage. For computation purposes, this common carrier component must be extracted and stored. The instant invention can advantageously be used to carry out this function although the use of the invention is not restricted to the carrying out of this function.

One method for retrieving the common carrier amplitude is described by Hermann Schmid in an article in Electronics, Jan. 10, 1966, titled "Integrated Circuit Replace Electromechanical Resolver." The accuracy of the system described in this article is limited by the number of components used in that, the greater the number of operational amplifiers, precision resistors and capacitors a circuit consists of, the less accuracy that can be expected.

It is an object of the instant invention to provide a simple electronic means for providing as one output the square root of the sum of the squares of two input signals.

It is a further object of the invention to provide electronic circuit means for extracting the common carrier component of the sin and cos output windings of a synchro differential resolver to thereby provide useful outputs related to sin and cos functions of the angle whose sin and cos are represented by electrical signals as relative amplitudes on the output windings of the synchro differential resolver.

According to the invention, a circuit for providing the square root of the sum of the squares of two input signals comprises first and second divider means each having output means and first and second input means; first and second multiplier means each having output means and first and second input means; adder means having output means and first and second input means; means for applying one of said input signals to the first input means of said first divider means and to the first input means of said first multiplier means; means for applying the other input signal to the first input means of said second divider means and to the first input means of said second multiplier means; means connecting the output of said first divider means to the second input means of said first multiplier means; means connecting the output of said second divider means to the second input means of said second multiplier means; means connecting the output of said first multiplier means to the first input means of said adder means; means connecting the output of said second multiplier means to the second input means of said adder means; and means connecting the output of said adder means to each of said second inputs of said first and second divider means; whereby the signal at the output of the adder means is representative of the square root of the sum of the squares of the input signals.

In a preferred embodiment of the invention, one input signal is derived from the sin output winding of a synchro differential; and the other input signal is derived from the cos winding of the synchro differential; whereby the signal at the output of said first divider means is representative of the sin function and the signal at the output of the second divider means is representative of the cos function.

The invention will be better understood by reference to the following description together with the accompanying drawings in which.

Figure 1:
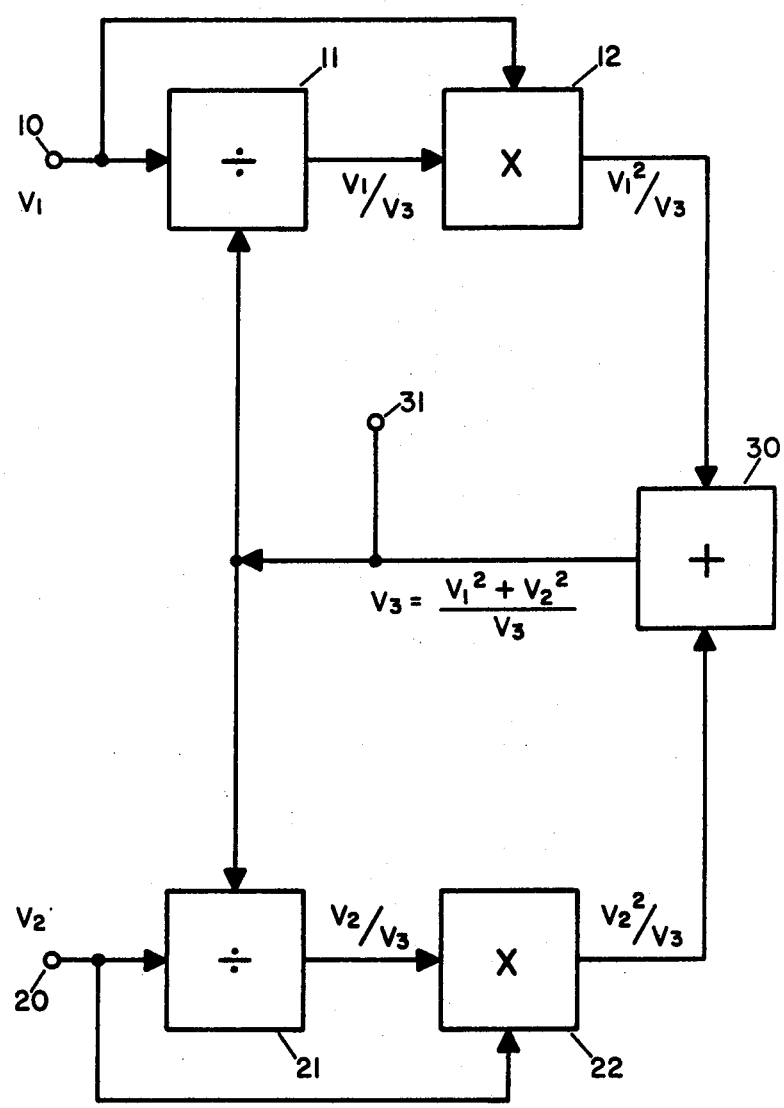
FIG. 1 illustrates one embodiment of the invention in block diagram form.

Referring now to FIG. 1, two input signals $V_1$ and $V_2$ are applied from terminals 10 and 20 respectively to dividing means 11 and 21 and also, on separate conductors, multiplication means 12 and 22 respectively. The multiplication means 12 and 22 are fed at their second inputs from divider means 11 and 21 respectively. The outputs of the multiplication means are fed to the two inputs of adder means 30, and the output of the adder means is fed, by two separate paths, to the second inputs of divider means 11 and 21.

As can be seen, the output of the adder means, $V_3$, is equal to $$\frac{V_1^2 + V_2^2}{V_3},$$

so that $V_3^2 = V_1^2 + V_2^2$ and $V_3 = \sqrt{V_1^2 + V_2^2}$

Thus, the output at terminal 31 is equal to the square root of the sum of the squares of the input signals.

Figure 2:
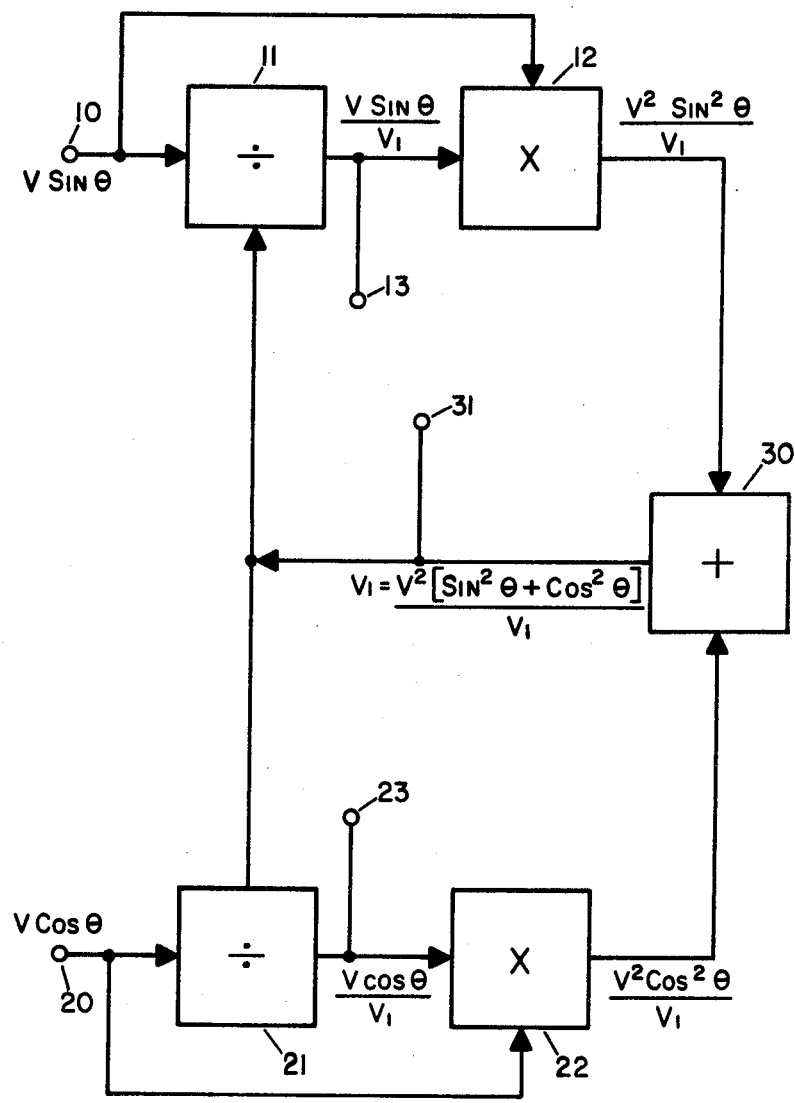
FIG. 2 shows a block diagram of a system which can be utilized to extract the common carrier component of a synchro differential resolver output in accordance with the invention.

In figure 2, the inputs at terminals 10 and 20 are the signals on the output windings of a synchro differential resolver, $V \sin\theta$ and $V \cos\theta$, where $V$ is the common carrier amplitude component. Like numerals refer to like parts in FIGS. 1 and 2. As can be seen, the output of the adder means 30 $V_1$ is equal to $$V^2 \frac{(\cos^2\theta + \sin^2\theta)}{V_1} = \frac{V^2}{V_1}, \text{ or } V_1^2 = V^2$$

so that $V_1 = V$, i.e., the vector sum of $V \sin\theta$ and $V \cos\theta$. Accordingly, the common carrier amplitude component may be obtained at terminal 31. Again, as $V = V_1$, the output at terminal 13 is the sin function and the output at terminal 23 is the cos function.

Figure 3:
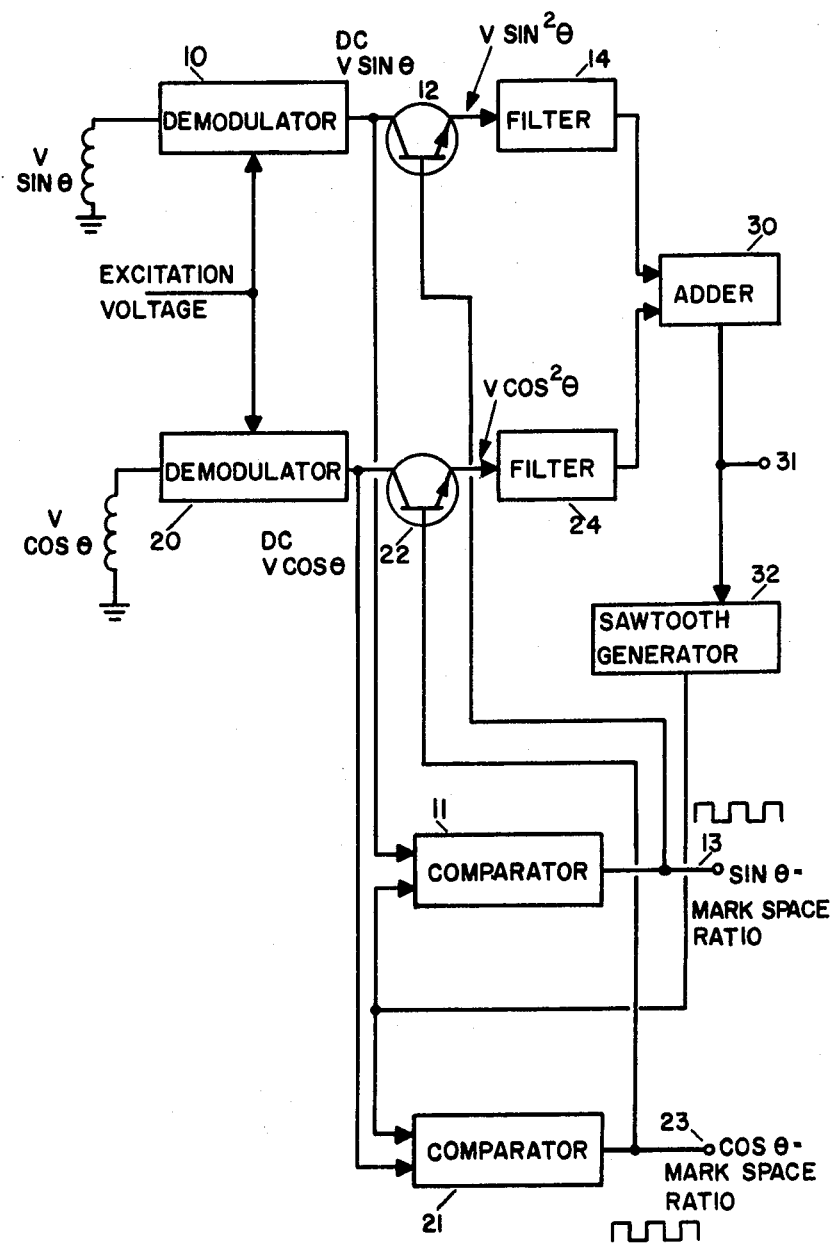
FIG. 3 illustrates a practical system for extracting the common carrier of a synchro differential resolver output in accordance with the invention.

FIG. 3 illustrates a practical embodiment of the invention. The $V \sin\theta$ and $V \cos\theta$ outputs of the synchro differential resolver are fed to demodulators 10 and 20 respectively, and the outputs of the demodulators are DC signals proportional in amplitude to the applied AC signals. Comparator means 11 and 21 correspond to the divider means in FIGS. 1 and 2 while switch means 12 and 22, correspond to the multiplication means. Although in the embodiment illustrated in FIG. 3, switching transistors are shown, it will be apparent that other electronic switch means could be used. Filter means 14 and 24 convert the pulse output of switches 12 and 22 respectively to DC levels, while sawtooth generator 32 produces a linear sawtooth whose amplitude is related to the amplitude at the output of adder means 30.

In operation, the output of the sawtooth generator is fed as one input to both the comparator means 11 and 21, the other input to the comparator means being the DC outputs of the appropriate demodulator means. The sawtooth generator may provide a triangular signal as shown in FIG. 4, in which case the comparators are arranged to provide a zero output when the sawtooth amplitude is greater than the $V \sin\theta$ or $V \cos\theta$ input, and to provide a positive output when the $V\sin\theta$ or $V\cos\theta$ input is equal to or greater than the sawtooth amplitude.

Figure 4:
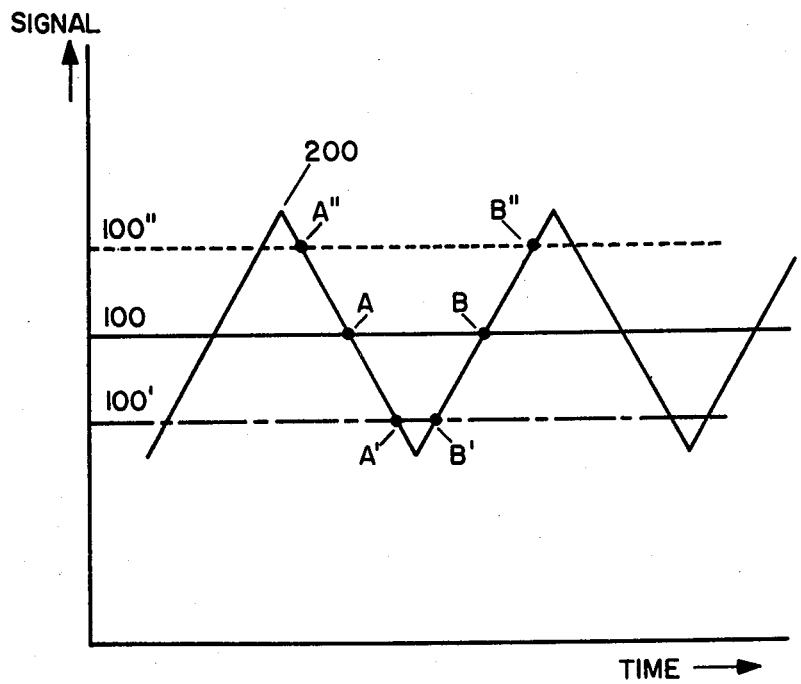
FIG. 4 is a graph provided to aid in the explanation of the operation of the comparator in FIG. 3.

FIG. 4 shows the inputs to either of the comparators in a preferred embodiment of the invention. 100 is the output of the appropriate demodulator and 200 is the output of the sawtooth generator. The pulse length at the output of the comparator is proportional to the time interval A–B. Thus, if the output of a demodulator is increased (an increase in the angle size will increase the output of demodulator 10 but decrease the output of demodulator 20) to 100'', the pulse length, determined by the interval A''–B'', is increased, and if the output of the demodulator is decreased, the pulse length is decreased. Thus, the output of the comparators are square waves whose mark/space ratio is proportional to $\sin\theta$ or $\cos\theta$ so that, in effect, the $V\cos\theta$ and $V\sin\theta$ DC levels are divided by the $V$ level of the sawtooth generator.

The outputs of the comparators are fed to the bases of transistors 12 and 22. As these transistors are NPN types, they will be turned on only when a positive signal is applied to the base so that the signals at the collectors of the transistors are multiplied by the mark/space ratio at the output of the comparators, and the inputs to filters 14 and 24 are square waves which, by virtue of a combination of their amplitudes and mark/space ratios, are proportional to $V\sin^2\theta$ and $V\cos^2\theta$ respectively. Filters 14 and 24 convert these square waves to DC levels which are then summed in adder 30 to provide an amplitude proportional to the common carrier component $V$.

Thus, the $\sin\theta$ and $\cos\theta$ functions are available at terminals 13 and 23 respectively, and the common carrier component may be taken off at terminal 31.

Although several embodiments have been described in the foregoing, this was for the purpose of illustrating, but not limiting, the invention. Various modifications which will come readily to the mind of one skilled in the art are considered to be within the scope of the invention.

We claim:

1. In a circuit for providing the square root of the sum of the squares of two input signals, one of said input signals being derived from the sin output winding of a synchro differential and the other of said input windings being derived from the cos output winding of a synchro differential, comprising:
first and second divider means each having output means and first and second input means; first and second multiplier means each having output means and first and second input means; adder means having output means and first and second input means; means for applying one of said input signals to the first input means of said first divider means and to the first input means of said first multiplier means; means for applying the other input signal to the first input means of said second divider means and to the first input means of said second multiplier means; means connecting the output of said first divider means to the second input means of said first multiplier means; means connecting the output of said second divider means to the second input means of said second multiplier means; means connecting the output of said first multiplier means to the first input means of said adder means; means connecting the output of said second multiplier means to the second input means of said adder means; and means connecting the output of said adder means to each of said second inputs of said first and second divider means; whereby the signal at the output of the adder means is representative of the square root of the sum of the squares of the input signals and the signal at the output of said first divider means is representative of the sin function and the signal at the output of the second divider means is representative of the cos function; characterized in that said divider means comprise comparator means and said multiplier means comprise switch means; and further comprising first and second demodulator means; said first demodulator means being connected in circuit between said sin winding of said synchro differential and said first comparator means; and said second demodulator means being connected in circuit between said cos winding of said synchro differential and said second comparator means; first and second filter means; said first filter means being connected in circuit between said first switch means and said adder means; and said second filter means being connected in circuit between said second switch means and said adder means; and a sawtooth generator connected in circuit between said adder means and first and second comparator means.

2. A circuit as defined in claim 1 wherein said first and second switch means comprise first and second transistors each having base, emitter and collector electrodes, the output of said first demodulator means being connected to the collector of said first transistor, the output of said second demodulator means being connected to the collector of said second transistor, the output of said first comparator being connected to the base of said first transistor, the output of said second comparator being connected to the base of said second transistor, the input of said first filter means being connected to the emitter of said first transistor, and the input of said second filter being connected to the emitter of said second transistor.

* * * * *